United States Patent [19]

Howell

[11] 4,168,514

[45] Sep. 18, 1979

[54] COMBINATION CIRCUIT BREAKER-LIGHTNING ARRESTOR

[75] Inventor: Edward K. Howell, Simsbury, Conn.

[73] Assignee: General Electric Company, New York, N.Y.

[21] Appl. No.: 861,233

[22] Filed: Dec. 16, 1977

[51] Int. Cl.² .............................................. H02H 7/22
[52] U.S. Cl. ....................................... 361/56; 361/55; 361/106; 361/115; 337/28; 337/34
[58] Field of Search ................. 361/56, 55, 54, 57, 361/91, 103, 106, 115, 117; 335/20, 191; 337/15, 20, 28, 31, 34, 35, 47, 100, 104, 182; 338/20, 21, 22 R, 22 SD

[56] References Cited

U.S. PATENT DOCUMENTS

| | | | |
|---|---|---|---|
| 3,152,287 | 10/1964 | Edmunds | 361/115 |
| 3,312,889 | 4/1967 | Gold | 361/56 X |
| 3,464,040 | 8/1969 | Powell | 335/191 |
| 3,717,792 | 2/1973 | Gryctko | 361/115 X |
| 3,733,516 | 5/1973 | Grunert et al. | 361/56 |
| 3,737,725 | 6/1973 | Donnelly | 361/56 |
| 3,887,849 | 6/1975 | Nagel | 361/56 X |
| 3,889,222 | 6/1975 | Takano et al. | 361/91 X |
| 3,934,175 | 1/1976 | Clark | 361/91 X |
| 4,019,097 | 4/1977 | Miller et al. | 337/35 X |
| 4,068,281 | 1/1978 | Harnden, Jr. | 361/106 |

OTHER PUBLICATIONS

"Circuit Protectors," Catalogue No. 749, 1974, MCG, Electronics Inc., pp. 1-5.

*Primary Examiner*—Patrick R. Salce
*Attorney, Agent, or Firm*—Robert A. Cahill; Walter C. Bernkopf; Philip L. Schlamp

[57] ABSTRACT

A conventional automatic electric circuit breaker is combined with a varistor to provide both overcurrent and overvoltage circuit protection. The varistor is connected between the load end of the circuit breaker and neutral to shunt to ground the currents associated with lightning induced voltage surges. As a fail-safe feature, abnormal leakage current drawn by the varistor under normal line voltage conditions directly and/or indirectly heats the thermal element of the breaker trip unit, ultimately tripping the breaker.

16 Claims, 5 Drawing Figures

COMBINATION CIRCUIT BREAKER-LIGHTNING ARRESTOR

BACKGROUND OF THE INVENTION

The present invention relates generally to lightning arrestors, and particularly to a fail-safe lightning arrestor for protecting low-voltage, residential-type circuits and their connected loads from the damaging consequences of lightning induced high voltage surges.

Currently available lightning arrestors for installation in residential circuits typically utilize a voltage-dependent resistor, such as a silicon carbide varistor, in series with a spark gap. The presence of the spark gap is prescribed since currently available silicon carbide varistors suitable for lightning arrestor application, being connected from line to neutral in a service entry panelboard, would otherwise draw excessive current at normal line voltage and thus heat up to the point of ultimately destroying itself. Failure of the silicon carbide varistor could then constitute a short circuit with damaging consequences. Since the spark gap has a typical breakdown voltage of 2000 volts, the arrestor affords no overvoltage protection below this level. While voltage surges below 2000 volts do not pose significant harm to wiring and most connected loads, they are potentially damaging to electronic circuitry, particularly solid state electronic circuitry currently utilized in televisions, radios and audio equipment.

Another disadvantage with currently available lightning arrestors resides in the manner of their electrical connection into the circuit to be protected. The arrestor is typically supplied with a plurality of long leads emanating from a case in which the spark gap and varistor are housed. The case must be mounted to the service entry panel enclosure, typically in a knockout, and the lead wires individually connected to the service entry mains and the panel neutral bus. The only convenient places to effect the electrical connections to the mains are either at the line or load terminal connectors of the main circuit protective device, for example, the main circuit breaker. Unfortunately, conventional breaker terminal connectors, such as lugs, are not UL listed for terminating more than one wire. Thus, connecting the lightning arrestor leads into the service entry mains via the main breaker terminal lugs, pursuant to affording voltage surge protection to the entire residential distribution circuit, voids the Underwriters Laboratories listing on the service entry equipment.

Moreover, the typical do-it-yourself homeowner would be reluctant to make arrestor lead terminations at the main breaker terminal connectors, and with good cause as this procedure is potentially hazardous. Thus, an electrician is invariably called upon to install a lightning arrestor. This adds considerably to the expense of lightning protection for residential circuitry, to the point that homeowners all too often elect to forego the protection altogether.

It is accordingly an object of the present invention to provide an improved home lightning arrestor.

An additional object of the present invention is to provide a lightning arrestor of the above character which is effective in protecting wiring and connected loads from both high and low level voltage surges.

A further object is to provide a lightning arrestor of the above character which can be conveniently and safely installed in existing service entry panel enclosures in an approved manner, even by non-electricians.

Still another object is to provide a lightning arrestor of the above character which is fail-safe.

Yet another object is to provide a lightning arrestor of the above character which is reliable in operation, compact in design and inexpensive to manufacture.

Other objects of the invention will in part be obvious and in part appear hereinafter.

SUMMARY OF THE INVENTION

In accordance with the present invention, there is provided a voltage surge suppressor capable of protecting residential circuitry and connected loads from the damaging consequences of high voltage surges, such as are induced on power lines by lightning strikes. In accordance with an important feature of the present invention, the voltage surge suppressor obviates the need for the spark gap found in conventional lightning arrestors, and thus low, as well as high level voltage surges are effectively suppressed. The elimination of the spark gap is made possible by combining a voltage-dependent resistor, such as a varistor, with a conventional automatic electric circuit breaker in a manner to provide fail-safe operation.

More specifically, the varistor, preferably a metal oxide varistor, is connected between the load end of the circuit breaker and ground, such that abnormal leakage current drawn by the varistor, evidencing a failure thereof, flows through the breaker trip unit. If the leakage current is of short circuit proportions, the breaker trips magnetically. On the other hand, the breaker will trip thermally if the leakage current drawn by the varistor exceeds the breaker current rating. As an added measure of fail-safe protection, the varistor is, in accordance with the present invention, packaged in thermally coupled relation with the thermal element, typically a bi-metal, of the breaker trip unit. Thus the heat generated in the varistor by the flow of abnormal leakage current therethrough will also indirectly heat the thermal element, thus contributing to the thermal tripping of the breaker pursuant to removing the failing varistor from the circuit.

As an additional feature of the present invention, the varistor is packaged with the circuit breaker in a molded case which is acceptable in any branch breaker mounting position of a circuit breaker panelboard. The case includes a stab line terminal connector and an externally accessible load terminal connector at the terminations of the breaker internal circuit. One terminal of the varistor is electrically connected internally of the case at a point intermediate the breaker trip unit and breaker load terminal. A lead emanating from the case facilitates effecting the ground connection of the other varistor terminal at the panel neutral bus. To physically install the voltage surge suppressor or lightning arrestor in the panelboard, while at the same time effecting the electrical connection of the varistor to the main, the breaker line terminal connector is simply plugged on to a panel stab. The circuit breaker, in addition to affording fail-safe protection with regard to the varistor, is also capable of affording traditional overcurrent protection to a branch circuit wired across its load terminal and the panel neutral bus. For single-phase three-wire service entries, consisting of two mains and a neutral, the cases of two breaker-arrestor combinations are tied together such that they can only be installed in adjacent branch breaker positions where the panel stabs are electrically fed from different ones of the two service entry mains. In this way, complete voltage surge protection is conveniently afforded the service entry equipment and all of the branch circuits. It will be appreciated that for three-phase service entries, complete overvoltage protection is provided by the proper installation of three breaker-arrestor combinations of the present invention.

The invention accordingly comprises the features of construction, combination of elements and arrangement of parts which will be exemplified in the construction hereinafter set forth, and the scope of the invention will be indicated in the claims.

For a fuller understanding of the nature and objects of the present invention, reference should be had to the following detailed description taken in conjunction with the accompanying drawing, in which.

Like reference numerals refer to corresponding parts throughout the several views of the drawing.

DETAILED DESCRIPTION

Figure 1:
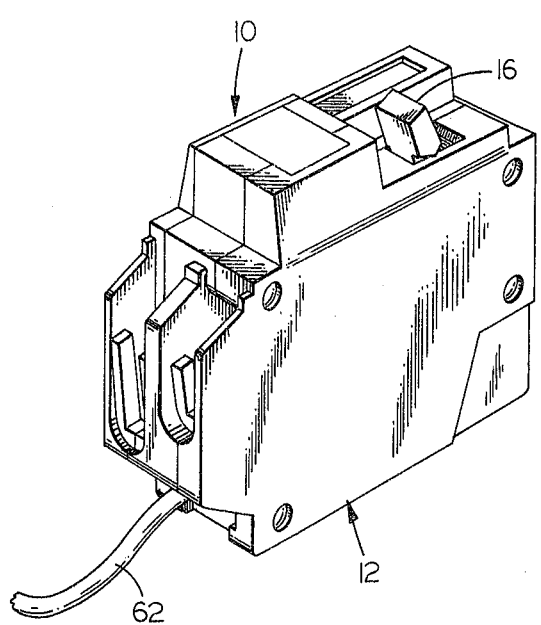
FIG. 1 is a perspective view of a combination circuit breaker-lightning arrestor constructed in accordance with the present invention.

Referring to the drawing, FIG. 1 depicts a combination circuit breaker-lightning arrestor, constructed in accordance with the present invention and generally indicated at 10. The breaker-arrestor combination is housed in a molded insulative case, generally indicated at 12. The case is preferably configured and sized in conformity with a conventional, residential molded case circuit breaker, such that the breaker-arrestor combination 10 is interchangeable therewith in existing circuit breaker service entry panelboards. In fact, I have found that the breaker-arrestor combination 10 of the present invention can be housed in the same molded case utilized for ground fault circuit interrupting (GFCI) circuit breakers currently being marketed by the General Electric Company under the trademark CB3; the lightning arrestor portion of the combination simply occupying the space within case 12 normally occupied by the ground fault module and trip solenoid.

Figure 2:
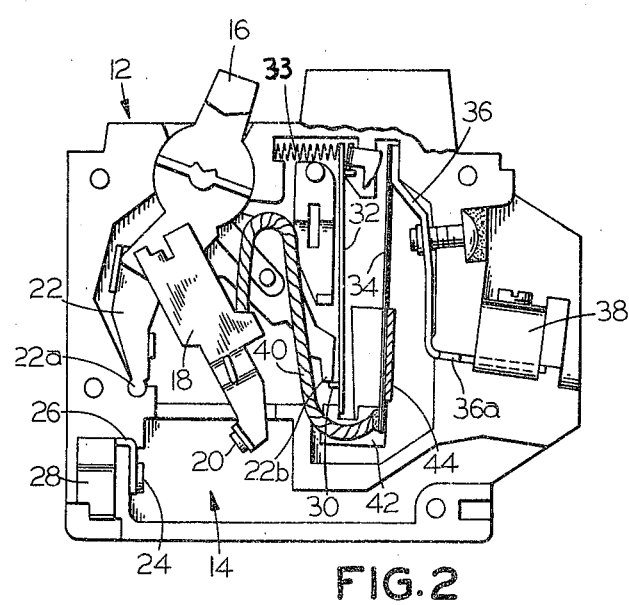
FIG. 2 is a side elevational view of the combination circuit breaker-lightning arrestor of FIG. 1, with a portion of the molded outer case broken away to expose the circuit breaker portion thereof.

The circuit breaker portion of the combination, as seen in FIG. 2, may be of the construction disclosed in commonly assigned U.S. Pat. No. 3,464,040 issued to D. B. Powell. In order to promote a complete understanding of the present invention, it is deemed desirable to briefly review the circuit breaker construction of this patent. Thus, the circuit breaker portion, generally indicated at 14, includes an operating handle 16 pivotally supported in case 12. A movable arm 18 carries a contact 20 at its lower end and is pivotally connected at its upper end to a depending portion of the handle. A tension operating spring (not shown) is connected between the contact arm 18 and a cradle 22 pivotally mounted within the case at 22a. A stationary contact 24 is carried by a depending inner end of a line strap 26 which is structured at its outer end to provide a line terminal stab connector 28 adapted for plug-on electrical engagement with a line stab (not shown) in a circuit breaker service entry panelboard.

Cradle 22 is normally retained in the reset position seen in FIG. 2 by a latch 30 in the form of a tab struck from a depending armature 32 pivotally mounted at its upper end within case 12. A spring 33 biases the depending portion of the armature to the left as seen in FIG. 2 to insure that the latch is in position to engage a tip 22b of cradle 22 and thus releasably retain the breaker operating mechanism in its reset or untripped condition.

An elongated bi-metal 34 is mounted at its upper end to the inner end of a load strap 36 which extends outwardly from the case interior to a load terminal at which electrical connection to a branch load circuit is made via a wire lug 38. A flexible braid 40 is connected between the contact arm 18 and the lower end of bi-metal 34. It is thus seen that the circuit breaker internal circuit extends serially from line terminal connector 28, line strap 26, fixed contact 24, movable contact 20 (when the movable arm is pivoted to its closed circuit position), movable arm 18, braid 40, bi-metal 34 and load strap 36 to the load terminal wire lug 38.

To effect a thermal trip of the circuit breaker 14 in response to overload currents, the lower end portion of bi-metal 34 deflects to the right, as seen in FIG. 2, and this movement is communicated to armature 32 via an armature hook 42. Corresponding rightward movement of armature 32 disengages latch 30 from cradle tip 22b to unlatch the breaker operating mechanism which then acts to separate the breaker contacts 24 and 20 by abruptly pivoting movable arm 18 to its open circuit position seen in FIG. 2.

To accommodate a more rapid tripping function in response to heavy overload or short circuit currents flowing through its internal circuit, a generally U-shaped magnetic field piece 44 is mounted by bi-metal 34. The heavy overload or short circuit current flowing through the bi-metal produces sufficient flux in the field piece to magnetically attract armature 32 rightward, thereby releasing cradle 22 to similarly trip the breaker operating mechanism and effect separation of the breaker contacts.

Figure 3:
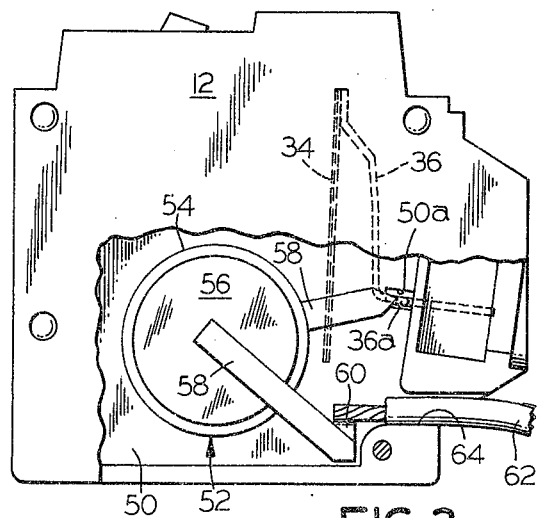
FIG. 3 is a side elevational view of the combination circuit breaker-lightning arrestor of FIG. 1, with a portion of the molded outer case broken away to expose the lightning arrestor portion thereof.
Figure 4:
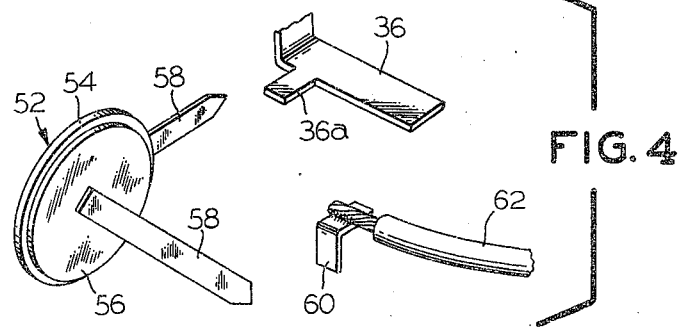
FIG. 4 is an exploded, assembly view of the voltage triggered switch seen in FIG. 3.

The lightning arrestor portion of the breaker-arrestor combination 10, as seen in FIG. 3, is housed in a compartment within case 12 separated from the circuit breaker compartment by a central partition 50. This lightning arrestor portion consists of a voltage-dependent resistor, generally indicated at 52 and preferably in the form of a metal oxide varistor. I have determined that a suitable varistor for application in the present invention should have, for a typical 120 volt circuit application, a nominal rating of 220 volts at 1 milliampere, and be capable of dissipating at least 20 joules and preferably 40 joules or more of electrical energy. The varistor 52 is fabricated, as seen in FIGS. 3 and 4, having a disk of varistor material 54 sandwiched between plate-like electrodes, one seen in 56. An elongated, substantially rigid terminal strap 58 is welded to each electrode 56. One of these terminal straps has its free end welded or soldered in electrical connection with a lateral extension 36a of breaker load strap 36 which protrudes through an opening 50a in partition 50 into the lightning arrestor compartment within case 12. The other terminal strap is welded or soldered to an L- shaped conductive strip 60 lodged within the lightning arrestor compartment. Also affixed in electrical connection with strip 60 is one end of an elongated lead 62 which extends externally of case 12 through an exitway 64 from the lightning arrestor compartment. As will be seen, the other end of lead 62 is for connection to the panel neutral bus pursuant to installing the combination circuit breaker-lightning arrestor.

Figure 5:
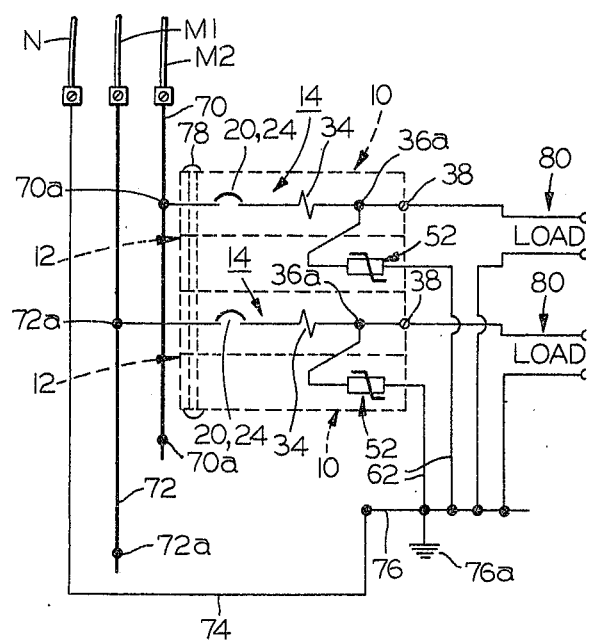
FIG. 5 is a schematic diagram illustrating the installation of a pair of circuit breaker-lightning arrestor combinations of FIG. 1 in a service entry circuit breaker panelboard.

To appreciate the operation of the circuit breaker-lightning arrestor combination 12, reference is had to FIG. 5 wherein a conventional single-phase, three-wire, circuit breaker service entry panelboard installation is schematically illustrated. The two mains M1 and M2 coming from a main circuit breaker (not shown) are connected to separately feed a pair of main buses 70 and 72. The neutral N from the service drop is connected via a conductor 74 to a panel neutral bus 76, which is solidly grounded as indicated at 76a. Buses 70 and 72 respectively mount stabs 70a and 72a which are commonly aligned in alternating fashion to define consecutive breaker mounting positions within the service entry panel. Thus, with two circuit breakers mounted in adjacent positions, the line terminal of one is plugged on a stab 70a of bus 70 while the line terminal of the other is plugged on a stab 72a of bus 72. This approach to circuit breaker panelboard design is conventional, as disclosed in commonly assigned U.S. Pat. No. 3,418,536.

Still referring to FIG. 5, a pair of circuit breaker-lightning arrestor combinations 10 are tied together by a series of elongated rivets, one indicated at 78, in conventional two-pole breaker fashion, such that the pair must be mounted in adjacent breaker mounting positions within the panelboard. Thus, one of the breaker-arrestor line terminals 28 is plugged on a stab 70a, while the line terminal of the other breaker-arrestor combination is plugged on a stab 72a, as diagrammatically illustrated in FIG. 5. Leads 62 of the two breaker-arrestor combinations 10 are electrically connected to panel neutral bus 76. It is thus seen that with the paired breaker-arrestor combinations 10 thus installed within the panelboard, the two mains M1 and M2 are connected via their respective main bus 70 and 72, the respective breaker internal circuits (closed contacts 20, 22 and bi-metals 34) and varistors 52 to ground panel bus 76. The varistors are thus properly electrically connected respectively between the two mains M1, M2 and the neutral N of the service entry drop to suppress voltage surges appearing on either one or both of the mains. The suppression of such voltage surges by shunting to ground the associated current surges protects not only the service entry panelboard, but also all of its branch circuits from the harmful consequences thereof. The circuit breaker portion 14 of each breaker-arrestor combinations 10, in addition to rendering the lightning arrestor portion fail-safe in the manner described below, can also serve to afford overcurrent protection to branch circuits 80 wired between breaker load terminal lugs 38 and panel neutral bus 76.

From FIG. 5, it is seen that when the breaker-arrestor combinations 10, are installed in the circuit breaker panelboard, each varistor 52 has essentially full line voltage applied across it, e.g. 120 volts for a typical residential installation. A properly selected metal oxide varistor, the preferred form of voltage-dependent resistor, will safely draw very little current at this line voltage, e.g., less than one milliamp. If for some reason the metal oxide varistor starts to fail, typically because of having operated to shunt excessively large lightning induced currents to ground, it will begin drawing abnormal or excessive leakage current. It is seen from FIG. 5 that this leakage current is drawn through the bi-metal 34 of the associated circuit breaker internal circuit. If this leakage current is of heavy overload or short circuit proportions, the circuit breaker portion 14 will trip magnetically.

On the other hand, if this leakage current coupled with any load current flowing in branch circuit 80 exceeds the current rating of the breaker portion 14, bi-metal 34 will be heated directly by the current of overload proportions flowing therethrough, and the breaker portion will trip thermally. Even if the current flowing through bi-metal 34 is insufficient to directly heat it sufficiently to effect a thermal trip, excessive leakage current flowing through the metal oxide varistor 52 will cause it to heat up. As best seen in FIG. 3, the varistor is packaged in sufficiently close physical relation with its associated bi-metal 34 as to be effectively thermally coupled therewith. Any heat generated in the varistor will raise the ambient temperature within the circuit breaker compartment of case 12 and also will be conducted via varistor terminal strap 58 and breaker load terminal strap 36 to bi-metal 34, thereby indirectly heating it. The combined effects of direct bi-metal heating by virtue of the current flowing through it plus the indirect heating of the bi-metal by the heat generated by the varistor will eventually culminate in thermal tripping of the circuit breaker.

From the foregoing description, it is seen that the combination circuit breaker-lightning arrestor of the present invention inherently provides a convenient, safe and approved approach to installing a lightning arrestor in existing circuit breaker service entry panelboards, even by non-electricians. Since, in accordance with the present invention, the voltage surge suppressor is wired from line to neutral through the circuit breaker trip unit, it is rendered fail-safe without the inclusion of a spark gap. Thus, low level voltage surge protection is provided to particularly voltage sensitive loads, such as solid state electronic circuitry. In addition to rendering the voltage-dependent resistor fail-safe, the circuit breaker portion of the combination is also capable of affording overcurrent protection to a branch circuit wired thereof. Moreover, packaging the lightning arrestor with a circuit breaker in the manner taught by the present invention has the additional advantage of affording a reduction in the impedance of the circuit connections connecting the suppressor between line and neutral. Consequently, the voltage drop developed across this circuit connection impedance by the shunting to ground of lightning induced current surges of many thousands of amperes is thus correspondingly reduced. Since this voltage drop is imposed across the branch circuit loads, any reduction in its magnitude inures to the benefit of the circuit loads. For single-phase, three-wire service entries, two circuit breaker-lightning arrestor combinations are ganged together for installation in adjacent breaker mounting positions within a circuit breaker panelboard so as to automatically protect the panelboard and all branch circuits from lightning induced voltage surges. While the present invention has been disclosed in its application to 120/240 volt residential-type circuit installations, it will be appreciated that my invention can be utilized in higher voltage circuit installations as well.

I have specifically disclosed herein the use of a metal oxide varistor as the lightning arrestor component since it is the only voltage-dependent resistor material of which I am aware that has the requisite voltage versus resistance characteristic, low cost, small size, energy handling capability, and low current drain at normal line voltage to obviate the need for a spark gap. Silicon carbide varistors, as presently available for lightning arrestor application draw excessive current at normal line voltage and thus overheat to eventual self-destruction without the presence of a series spark gap. Selenium is a varistor material having the requisite voltage-resistance characteristics to be utilized without a spark gap, however commercially available selenium varistors cannot handle the energies associated with lightning surges. Zener diodes are ideal voltage suppressors and could be utilized without a spark gap, however, to handle lightning surges, they would necessarily be prohibitively large in size and extremely expensive. However, as materials technology advances, these, as well as other materials will doubtless become available which commend themselves for utilization in my invention.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A fail-safe lightning arrestor comprising, in combination:
   A. a circuit breaker including
      (1) a molded case compatible for installation in a circuit breaker panelboard,
      (2) a line terminal for electrical connection to an electrical service entry main feeding the panelboard,
      (3) circuit interrupting contacts, and
      (4) an automatic trip mechanism including a thermally responsive trip element mechanically operative to initiate tripping of said contacts to an open circuit condition; and
   B. a lightning induced voltage surge suppressor capable of dissipating at least 20 joules of energy, said suppressor including
      (1) a first terminal connected to said line terminal through said contacts, and
      (2) a second terminal for connection to an electrical ground,
      (3) said suppressor providing a continuous circuit path between its terminals and being operative, with said contacts closed, to shunt to ground the currents associated with lightning induced voltage surges appearing on the service entry main, and
      (4) said suppressor accommodated in said molded case in thermally coupled relation with said trip element such that heat generated by said suppressor in response to abnormal current drawn by said suppressor under normal voltage conditions eventually leads to trip initiating mechanical operation of said trip element.

2. The fail-safe lightning arrestor defined in claim 1, wherein said voltage surge suppressor consists exclusively of a metal oxide varistor.

3. The fail-safe lightning arrestor defined in claim 1, wherein said line terminal is in the form of a female stab connector capable of plug-on electrical engagement with a male stab connector in a service entry panelboard and to which the service entry main is electrically connected.

4. The fail-safe lightning arrestor defined in claim 3, which further includes an electrical lead having one end connected to said second terminal of said voltage surge suppressor internally of the case and extending externally of said case through a portal therein to facilitate electrical connection of its other end to electrical ground.

5. The fail-safe lightning arrestor defined in claim 4, wherein said voltage surge suppressor is comprised exclusively of a metal oxide varistor.

6. The fail-safe lightning arrestor defined in claim 1, wherein said trip mechanism further includes magnetic trip elements mechanically operative to trip said contacts to their open circuit condition in response to high level abnormal current drawn by said suppressor.

7. A fail-safe lightning arrestor comprising, in combination:
   A. an automatic electric circuit breaker including
      (1) a line terminal for connection to an electrical service entry main,
      (2) a load terminal for connection to an external branch load circuit,
      (3) circuit interrupting contacts, and
      (4) a thermal-magnetic trip unit including
         a. a bimetal electrically connected in series circuit with said contacts between said line and load terminals, said bimetal mechanically operative upon being directly heated by current of overload proportions drawn by the external load circuit to initiate tripping of said contacts to their open circuit condition, and
         b. electromagnetic trip elements magnetically coupled with said series circuit and mechanically operative to initiate tripping of contacts to their open circuit condition in response to current of heavy overload and short circuit proportions drawn by the external load circuit; and
   B. a varistor having a first terminal connected to said series circuit at a point downstream from said contacts and said electromagnetic trip elements, said varistor being in thermally coupled relation with said bimetal.
   C. whereby, the heat generated by said varistor in response to low level abnormal current flowing therethrough under normal voltage conditions eventually precipitates trip initiating mechanical operation of said bimetal, while current of heavy overload and short circuit proportions drawn by said varistor under normal voltage conditions precipitates trip initiating mechanical operation of said electromagnetic trip elements.

8. The fail-safe lightning arrestor defined in claim 7, which further includes a molded circuit breaker case mounting said line and load terminals in externally accessible relation, said case housing said breaker contacts and trip unit, and said varistor in thermally coupled relation with said bimetal.

9. The fail-safe lightning arrestor defined in claim 8, wherein said first terminal of said varistor is electrically connected internally of said case to said breaker series circuit at a point intermediate said bimetal and said load terminal.

10. The fail-safe lightning arrestor defined in claim 9, wherein said molded case is acceptable in a conventional circuit breaker mounting position within a circuit breaker service entry panelboard, and said line terminal is in the form of a female stab connector capable of plug-on electrical engagement with a panelboard male stab electrically connected to a service entry main, said fail-safe ligntning arrestor further including an electrical lead wire connected at one end to said varistor second terminal within said case and extending externally of said case through a portal therein for the electrical connection of its other end to a grounded panelboard neutral bus.

11. The fail-safe lightning arrestor defined in claim 10, wherein said varistor is a metal oxide varistor.

12. Fail-safe lightning arrestor apparatus for installation in a circuit breaker panelboard fed from a single-phase, three-wire service entry having two mains and a neutral, the panelboard including a grounded bus to which the service entry neutral is connected, a pair of main bus bars to which the two service entry mains are individually connected, and a plurality of aligned male stabs alternately connected to the two main bus bars, each male stab being physically associated with a different breaker mounting position within the panelboard, said lightning arrestor apparatus comprising, in combination:

A. a pair of combination circuit breaker-lightning arrestors, each including
  (1) a molded case compatible for mounting in a circuit breaker mounting position within a panelboard,
  (2) an automatic electric circuit breaker accommodated within said case, said circuit breaker including
   a. a line terminal in the form of an externally accessible female stab connector mounted by said case,
   b. an externally accessible load terminal mounted by said case,
   c. circuit interrupting contacts accommodated within said case, and
   d. a trip unit accommodated within said case and including a thermally actuated trip element connected in series circuit with said contacts between said line and load terminals, said trip unit being automatically operable to precipitate opening of said contacts to interrupt said series circuit, and
  (3) a voltage surge suppressor accommodated within said case in thermally coupled relation with said trip element and having
   a. a first terminal connected to said series circuit at a point beyond said contacts and said trip element from said line terminal,
   b. a second terminal, and
   c. a lead wire electrically connected at one end to said second terminal internally of said case and extending externally of said case through a portal therein to facilitate electrical connection of its other end to the grounded panelboard neutral bus; and
B. means joining said cases of said combination circuit breaker-lightning arrestor pair in side-by-side relation;
C. whereby said lightning arrestor apparatus is installable in adjacent circuit breaker mounting positions within the panelboard with the line terminal female stab connectors of said combination circuit breaker lightning arrestors plugged on the panelboard male stabs associated with the adjacent breaker mounting positions, said voltage surge suppressors being thereby individually connected in circuit across a different one of the service entry mains and the service entry neutral to shunt to ground the currents associated with lightning induced voltage surges appearing on either of the service entry mains, and the heat generated by either of said suppressors in response to abnormal current flowing therethrough under normal line voltage conditions is coupled to said trip element of the associated circuit breaker, ultimately leading to automatic operation of said trip unit to precipitate opening of said contacts of said associated circuit breaker.

13. The fail-safe lightning arrestor apparatus of claim 12, wherein each said voltage surge suppressor is comprised exclusively of a varistor.

14. The fail-safe lightning arrestor apparatus of claim 13, wherein said varistors are metal oxide varistors.

15. The fail-safe lightning arrestor apparatus of claim 12, wherein said circuit breaker of each said combination circuit breaker-lightning arrestor is operative to afford overcurrent protection to a branch circuit wired between said load terminal thereof and the panelboard grounded neutral bus.

16. The fail-safe lightning arrestor apparatus defined in claim 15, wherein said trip unit of each said combination circuit breaker-lightning arrestor includes magnetically actuated trip elements operating to precipitate opening of the associated contacts in response to current of heavy overload and short circuit proportions drawn by either the associated suppressor or the associated branch circuit.

* * * * *